Patented Sept. 25, 1951

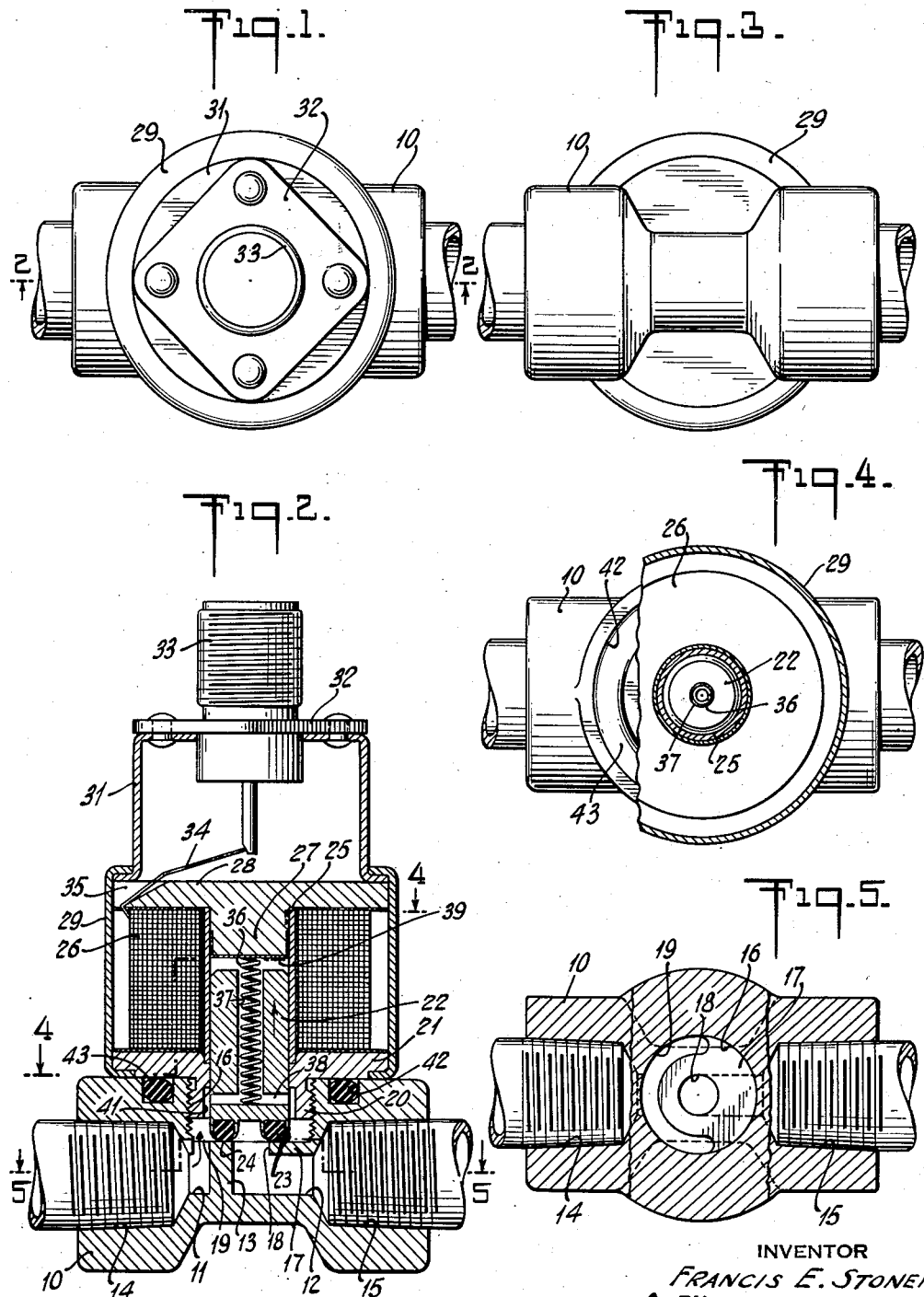

2,569,027

UNITED STATES PATENT OFFICE 2,569,027

LIGHTWEIGHT SOLENOID VALVE

Francis E. Stoner, Dayton, Ohio, assignor to United Aircraft Products, Inc., Dayton, Ohio, a corporation of Ohio Application February 12, 1945, Serial No. 577,408

4 Claims. (Cl. 137—139)

This invention relates to electrically actuated valve units, and particularly to a solenoid valve having special application to dilution systems as used in aircraft to modify the viscosity of the lubricating oil.

In such systems it is a practice to add to the circulating lubricant determined quantities of gasoline under the control of a solenoid valve, the valve responding to the opening and closing of an electrical circuit to deny and permit flow of the diluting gasoline to the lubricant conducting lines. The construction of solenoid valves used for this purpose has been the subject of varied and persistent development work looking toward improvement in weight reduction, design simplicity, durability and sureness of operation.

It is thought that the valve of the present invention exhibits such improvement to a degree heretofore not attained in the art, and it is an object of the invention to produce a solenoid valve so characterized.

More particularly, it is an object of the invention to effect a marked decrease in the weight of dilution system solenoid valves, to reduce the time and cost of their manufacture, to make their assembly and disassembly more easy, and to obtain a mechanism reliable and trouble-free in its operation.

Other objects and structural details of the invention will appear from the following description when read in connection with the accompanying drawings wherein:

Fig. 1 is a top plan view of a solenoid valve constructed in accordance with this invention;

Fig. 2 is a view in vertical longitudinal section, taken substantially along the line 2—2 of Fig. 1;

Fig. 3 is a bottom view in elevation of the valve of Fig. 1; and

Figs. 4 and 5 are views in cross section taken substantially along the respective lines 4—4 and 5—5 of Fig. 2.

Referring to the drawings, the illustrative embodiment of the invention is seen to comprise a cast body 10 formed with oppositely disposed bores 11 and 12 respectively terminating at an inner wall 13. The bores 11 and 12 are counterbored to form respective openings 14 and 15 adapted to receive pipe ends of the system in which the unit is disposed. Transversely of the bores 11 and 12 is a bore 16 terminating in a shelf 17 which functions as a valve seat. A vertical port 18 opens through the approximate center of shelf or seat 17 to bore 12. An arcuate port 19 in the peripheral portion of seat 17 opens into bore 11. There thus is established through bore 16 and by way of ports 18 and 19 communication between the bores 11 and 12. Accordingly, fluid entering the unit, as by way of opening 14, may pass through bore 11 and port 19 to bore 16 and then flow out of the unit through port 18, bore 12 and opening 15.

The wall of bore 16 is threaded to receive a bushing 20 which extends upward outside the body 10 and is formed with a flange 21 overlying and contacting the body. Slidably mounted within the bushing 20 is a plunger 22 of steel or like material. The inner end of plunger 22 lies adjacent the shelf or seat 17 and is formed with an open ended ring 23 in which is mounted seal 24, the projecting ends of ring 23 being pressed into gripping engagement with the seal. The seal 24 is arranged to engage the valve seat 17 in a position surrounding central port 18 whereby to discontinue communication between the ports 18 and 19 and thereby deny flow between the bores 11 and 12.

The plunger 22 projects upward beyond the flange 21 of bushing 20 and has a sliding fit in a sleeve 25 on which is wound an electrical coil 26. The lower end of sleeve 25 rests in a recess in bushing 20 and preferably is connected to the bushing by means constituting a seal and a bond. The upper end of sleeve 25 receives a central stud 27 on a plate 28 overlying the coil 26. The plate 28 has a diameter equal to that of the flange 21 of bushing 20, and the assembly comprising plate 28, flange 21 and sleeve 25 constitutes the solenoid spool. The spool is enclosed by a tubular casing 29. The lower end of casing 29 is bent into a cut out portion of the flange 21, while the upper end of the casing is turned over upon the top of plate 28. Clamped between the casing 29 and plate 28 is the flanged open end of a cap 31. The outer end of the cap 31 has mounted thereon a plate 32 which carries a fitting 33 for the attachment of an electrical cable. A wire lead 34 is passed through the fitting 33 into the space enclosed by cap 31 and through an opening 35 in the plate 28 to the coil 26.

When the coil 26 is energized, an electro-magnetic action is exerted on the plunger 22, lifting it from its seat in bore 16 and permitting flow between the ports 18 and 19. To hold and return the plunger to its seat on shelf 17 there is provided a compression spring 36 based on the stud 27 and pressing against the rear of the plunger. The spring 36 is disposed in a longitudinal passage 37 in the plunger 22, which passage, together with a transverse passage 38 at the lower end thereof, establishes communication between the rear of the plunger 22 and the bore 16 in advance of bushing 20. It will be observed that through the cooperation of plunger 22, stud 27 and sleeve 25, a chamber 39 is formed in back of the plunger, and that the presence of air or trapped liquid therein would resist opening movement of the plunger. According to the present construction, however, fluid which may flow to the chamber 39 while the plunger 22 is seated may escape therefrom by way of passages 37 and 38 to the bore 16 when the plunger rises from its seat. A counterbore 41 in the bushing 20 lies opposite the plunger passage 38.

It further will be noted that the passageway represented by port 19, counterbore 41, and passages 38 and 37 connects the inlet bore 14 and chamber 39. Therefore, the pressure of the incoming fluid will, in the closed position of the valve, aid the spring 36 in maintaining the valve closed.

As a seal against the escape of fluid around bushing 20 there is provided in the outer surface of body 10 an annular recess 42 in which is disposed a ring seal 43. The recess 42 is of such size as fully to contain the seal 43 when it is compressed by mounting of the bushing 20 in the body, the flange 21 being enabled to engage the body with a metal to metal contact.

What is claimed is:

1. A light weight valve and solenoid assembly, comprising a body formed with oppositely disposed inlet and outlet passages; a bore in said body transversely of said passages and formed with a flat surfaced valve seat at its bottom; ports opening through said valve seat and communicating said inlet and outlet passages; a bushing mounted in said bore and formed with a flange overlying and contacting said body; an annular recess in said body beneath said flange; a ring seal in said recess totally confined therein by said flange; a valve plunger reciprocably mounted in said bushing and adapted to rest on the valve seat in said bore to discontinue communication between said inlet and outlet passages; an electrical coil based on said flange and surrounding said plunger, said coil acting when energized to withdraw said plunger from its seat in said bore; a plate overlying the top of said coil; a tubular casing surrounding said coil and turned over at its one end to overlie said plate and turned over at its other end so as to be clamped between the bushing flange and the valve body; a cap mounted on said plate and secured thereto by the adjacent turned over end of said casing; and an electrical conduit entering the assembly by way of said cap and passed through said plate to said coil.

2. A light weight valve and solenoid assembly, comprising a body formed with oppositely disposed inlet and outlet passages, a bore in said body transversely of said passages, and formed with a flat surfaced valve seat at its bottom, a centrally positioned port in said valve seat opening into one of said oppositely disposed passages, a port in the peripheral area of said valve seat opening into the other of said oppositely disposed passages, said ports cooperating to establish through said bore communication between said passages, a plunger extending into said bore and having a projecting portion outside said body, an annular ring seal on the inner end of said plunger and adapted to engage said valve seat between said central port and said peripherally positioned port whereby to discontinue communication between said passages, a bushing mounted in said bore and formed with an external flange overlying and contacting the outer surface of said body and with an internal flange providing a bearing for said plunger, a solenoid coil surrounding said plunger and acting when energized to withdraw said plunger and valve from said valve seat, said coil having one end engaging the flange of said bushing, a plate overlying the top of said coil, a tubular casing surrounding said coil, the ends of said casing being respectively turned over said plate and the flange on said bushing, an electrical lead passed through said plate and connected to said coil, and a passage through said plunger communicating with the bore in said body below the internal flange on said bushing.

3. A light weight valve and solenoid assembly, comprising a body having oppositely disposed inlet and outlet passages, a bore in said body transversely of said passages and formed with a flat surfaced valve seat at its bottom; means opening through said valve seat communicating said inlet and outlet passages; a bushing mounted in said bore and formed with a flange overlying and contacting the outer surface of said body; a solenoid plunger slidably mounted in said bushing; an annular seal on the lower end of said plunger arranged to contact the valve seat in the bottom of said bore in position to prevent communication between said inlet and outlet passages; a solenoid coil surrounding said plunger and acting when energized to withdraw said plunger and valve from said valve seat, said coil having one end engaging the flange of said bushing; a plate engaging the other end of said coil, and defining in conjunction with said plunger a closed chamber within said coil; a central vertical bore in said plunger opening through the upper end thereof and terminating short of the lower end thereof; radial ports in said plunger communicating with said vertical bore at the lower end thereof; and a coil spring based on said plate and received in the bore in said plunger urging said plunger in a direction to engage said valve thereon with said valve seat.

4. A light weight valve and solenoid assembly, comprising a body, formed with oppositely disposed inlet and outlet passages; a bore in said body transversely of said passages; ports opening through the bottom of said bore and communicating said inlet and outlet passages, one of said ports being in the center of said bore and presenting a valve seat; a bushing mounted in said bore and formed with a flange overlying and contacting said body; an annular recess in said body beneath said flange; a ring seal in said recess totally confined therein by said flange; a valve plunger reciprocably mounted in said bushing and adapted to engage said valve seat to discontinue communication between said inlet and outlet passages; an electrical coil based on said flange and surrounding said plunger, said coil acting when energized to withdraw said plunger from its seat in said bore; a plate overlying the top of said coil; a tubular casing surrounding said coil and turned over at its one end to overlie said plate and turned over at its other end so as to be clamped between the bushing flange and the valve body; a cap mounted on said plate and secured thereto by the adjacent turned over end of said casing; and an electrical conduit entering the assembly by way of said cap and passed through said plate to said coil.

FRANCIS E. STONER.

(References on following page)

REFERENCES CITED

The following references are of record in the file of this patent:

UNITED STATES PATENTS

| Number | Name | Date |
|---|---|---|
| 1,629,815 | Aikman | May 24, 1927 |
| 2,096,763 | Ray | Oct. 26, 1937 |
| 2,114,961 | Gille | Apr. 19, 1938 |
| 2,181,423 | Gille | Nov. 28, 1939 |
| 2,290,177 | Grant | July 21, 1942 |
| 2,291,599 | Ray | Aug. 4, 1942 |
| 2,353,835 | Lane | July 18, 1944 |
| 2,366,006 | Culver | Dec. 26, 1944 |
| 2,399,843 | Adams | May 7, 1946 |
| 2,402,950 | Culver | July 2, 1946 |

FOREIGN PATENTS

| Number | Country | Date |
|---|---|---|
| 485,384 | France | Oct. 12, 1917 |